(12) United States Patent
Li et al.

(10) Patent No.: US 11,828,855 B2
(45) Date of Patent: Nov. 28, 2023

(54) SENSOR SUPPORT SYSTEMS AND METHODS

(71) Applicant: Beijing Tusen Zhitu Technology Co., Ltd., Beijing (CN)

(72) Inventors: Peng Li, Beijing (CN); Nan Wu, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 546 days.

(21) Appl. No.: 17/031,048

(22) Filed: Sep. 24, 2020

(65) Prior Publication Data
US 2021/0088669 A1 Mar. 25, 2021

(30) Foreign Application Priority Data
Sep. 24, 2019 (CN) .......................... 201921595894.8

(51) Int. Cl.
*B60S 1/62* (2006.01)
*G01S 17/931* (2020.01)
*A01M 29/34* (2011.01)
*G01S 7/481* (2006.01)

(52) U.S. Cl.
CPC .......... *G01S 17/931* (2020.01); *A01M 29/34* (2013.01); *B60S 1/62* (2013.01); *G01S 7/481* (2013.01)

(58) Field of Classification Search
None
See application file for complete search history.

(56) References Cited

U.S. PATENT DOCUMENTS

| | | | |
|---|---|---|---|
| 10,259,431 B1* | 4/2019 | Ybarra | B08B 3/02 |
| 11,554,757 B2* | 1/2023 | Krishnan | B60S 1/62 |
| 2007/0181810 A1* | 8/2007 | Tan | G01S 7/4811 |
| | | | 250/341.1 |
| 2012/0185134 A1* | 7/2012 | Preston | G06F 9/44505 |
| | | | 701/45 |
| 2013/0092758 A1* | 4/2013 | Tanaka | B60S 1/52 |
| | | | 239/284.1 |
| 2014/0009616 A1* | 1/2014 | Nakamura | H04N 5/14 |
| | | | 348/148 |
| 2015/0040953 A1* | 2/2015 | Kikuta | B60S 1/56 |
| | | | 134/123 |
| 2015/0151722 A1* | 6/2015 | Gokan | H04N 23/51 |
| | | | 134/198 |
| 2015/0166021 A1* | 6/2015 | Gokan | H04N 23/811 |
| | | | 134/102.2 |
| 2015/0183406 A1* | 7/2015 | Tanaka | B08B 3/02 |
| | | | 134/99.1 |

(Continued)

*Primary Examiner* — Hovhannes Baghdasaryan
(74) *Attorney, Agent, or Firm* — Perkins Coie LLP

(57) ABSTRACT

Methods, apparatus and systems that relate to a sensor bracket, a sensor assembly that includes the sensor bracket, as well as movable objects and vehicles equipped with the sensor assembly are described. One example sensor bracket includes a bracket body having a first end and a second end. The first end of the bracket body is configured to connect to an automobile and the second end of the bracket body is configured to connect to a sensor. A first air curtain machine is positioned at the second end of the bracket body, the first air curtain machine having an air outlet that is positioned to cause air to flow from the first air curtain machine through the air outlet across a forward-facing direction of the sensor.

20 Claims, 16 Drawing Sheets

(56) References Cited

U.S. PATENT DOCUMENTS

| | | | |
|---|---|---|---|
| 2015/0353024 A1* | 12/2015 | Cooper | B60R 11/04 |
| | | | 348/148 |
| 2017/0313286 A1* | 11/2017 | Galera | B08B 3/02 |
| 2021/0061237 A1* | 3/2021 | Krishnan | G01S 7/4813 |

* cited by examiner

SENSOR SUPPORT SYSTEMS AND METHODS

PRIORITY CLAIM

This patent document claims priority to the Chinese Application No. 201921595894.8 filed on Sep. 24, 2019. The entire contents of the above-noted application are hereby incorporated by reference as part of the disclosure of this document.

TECHNICAL FIELD

This patent document relates to sensor technologies for autonomous vehicles.

BACKGROUND

Autonomous or "self-driving" vehicles are vehicles capable of sensing their environment and moving without a human driver in control. Autonomous vehicles use navigation technology for sensing the position and movement of a vehicle and, based on the sensing, autonomously controlling the vehicle to navigate towards a destination. Autonomous vehicle navigation may be used in transportation of people, goods and services.

SUMMARY OF CERTAIN EMBODIMENTS

The techniques disclosed herein can be implemented in various embodiments to achieve a sensor bracket, a sensor assembly comprising the bracket and a method of manufacturing the sensor assembly.

One aspect of the disclosed embodiments relates to a sensor bracket that includes a bracket body having a first end and a second end. The first end of the bracket body is configured to connect to an automobile, the second end of the bracket body is configured to connect to a sensor. The sensor bracket further includes a first air curtain machine positioned at the second end of the bracket body, the first air curtain machine having an air outlet that is positioned to cause air to flow from the first air curtain machine through the air outlet across a forward-facing direction of the sensor.

Another aspect of the disclosed embodiments relates to a sensor assembly that includes a sensor and a sensor bracket. The sensor bracket of the sensor assembly comprises a bracket body having a first end and a second end. The first end of the bracket body is configured to connect to an automobile, the second end of the bracket body is configured to connect to a sensor. The sensor bracket further includes a first air curtain machine positioned at the second end of the bracket body, the first air curtain machine having an air outlet that is positioned to cause air to flow from the first air curtain machine through the air outlet across a forward-facing direction of the sensor.

Yet another aspect of the disclosed embodiments relates to a method of producing a sensor assembly that includes providing a sensor and providing a sensor bracket. The sensor bracket provided includes a bracket body having a first end and a second end. The first end of the bracket body is configured to connect to an automobile, the second end of the bracket body is configured to connect to a sensor. The sensor bracket further includes a first air curtain machine positioned at the second end of the bracket body, the first air curtain machine having an air outlet that is positioned to cause air to flow from the first air curtain machine through the air outlet across a forward-facing direction of the sensor.

An aspect of the disclosed technology relates to a method of operating a vehicle that includes positioning a sensor bracket on the vehicle and providing a sensor. The sensor bracket includes a bracket body having a first end and a second end. The first end of the bracket body is configured to connect to an automobile and the second end of the bracket body is configured to connect to the sensor. The method further includes operating a first air curtain machine positioned at the second end of the bracket body, the first air curtain machine having an air outlet that is positioned to cause air to flow from the first air curtain machine through the air outlet across a forward-facing direction of the sensor while the vehicle is driving in the forward-facing direction.

The subject matter described in this patent document can be implemented in specific ways that provide one or more of the following features.

DETAILED DESCRIPTION

Figure 1:
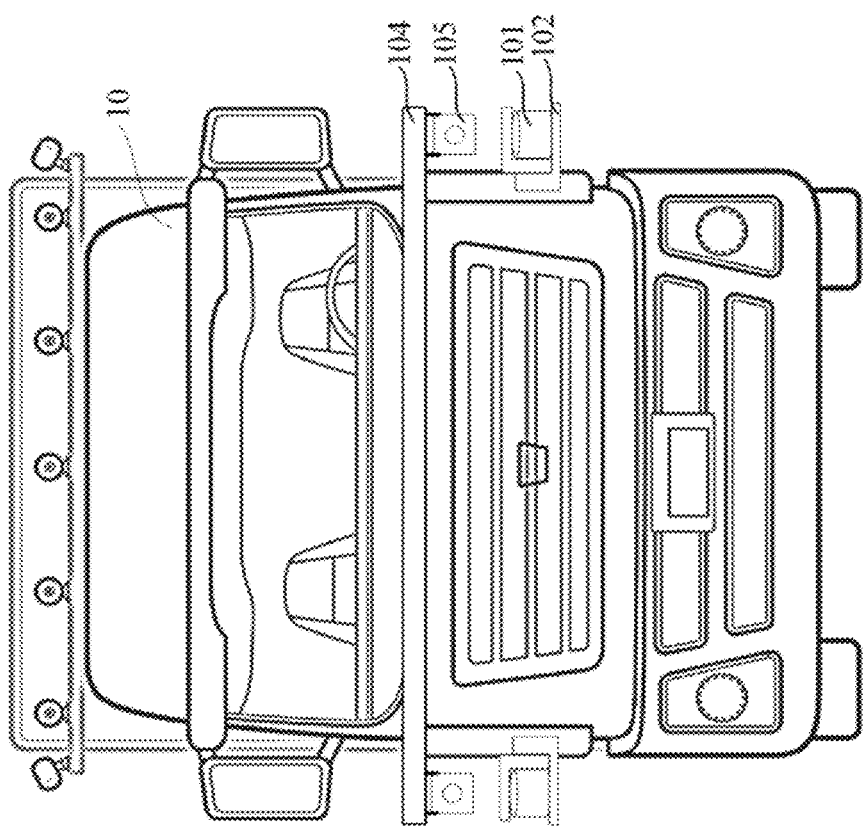
FIG. 1 illustrates a schematic diagram of sensors and sensor brackets on an autonomous truck.

Currently, autonomous driving technology has been relatively well developed. The current autonomous driving technology generally uses light detection and ranging (LiDAR), laser radar, camera, millimeter wave radar, ultrasonic radar and other equipment to perceive the external environment, and control the vehicle driving according to the external environment (such as, e.g., acceleration, deceleration, lane change, and parking operations). In many cases, in order to better perceive the surrounding objects, LiDARs are generally installed on a LiDAR bracket and extend out on both sides of a vehicle. In a similar way, cameras are generally installed on a camera bracket and extend out on both sides of the vehicle. Sensors such as LiDAR and cameras are particularly important for perception of the environment around the vehicle. However, for example, in some mosquito-prone areas in the wild, especially when the vehicle is driving at a high speed, mosquitos may be hit by the vehicle and adhere to sensors such as LiDARs and cameras, thereby blocking sensing elements of the sensors and thus affecting the sensor's perception. More generally, dust, debris, insects, rain drops, etc. are typically present in the air around moving vehicles on highways and other roads and can occlude sensing elements of the vehicle's sensors. Avoiding accumulation of such objects (collectively called mosquitos in the present document) on sensory surfaces of an autonomous vehicle will be desirable and advantageous for operation of the autonomous vehicle.

The example embodiments of the present application will be described in conjunction with the accompanying drawings. Obviously, the example embodiments are only some of the embodiments according to the technology disclosed herein, rather than all the embodiments. Based on the example embodiments described in this patent document, all other embodiments obtained by those of ordinary skill in the art without creative work fall within the protection scope of this patent document.

It should be noted that the terms "first" and "second" used in the description and claims of the present application and the above-mentioned drawings are generally used to distinguish similar objects and are not necessarily used to describe a specific sequence or sequences. In addition, the terms "including" and "having" and any variations of them are intended to cover nonexclusive inclusions. For example, a process, a method, a system, a product, or a device that includes a series of steps or units is not necessarily limited to those explicitly listed. Those steps or units may include other steps or units that are not listed or that are inherent to these processes, methods, products, or equipment.

It should be further noted that while, for simplicity of explanation, the same reference numbers have been used to identify some of the elements in different figures (e.g., LiDAR lower mounting cover 311 in FIGS. 5 and 10), it is understood that this designation does not necessarily mean that those elements are identical. In particular, one or more characteristics of the elements (e.g., material, dimension, shape, etc.) are contemplated to be modified based on the particular sensor bracket and/or sensor assembly configuration and the desired performance characteristics.

In some embodiments of the present application, the terms "vehicle" and "movable object" are broadly interpreted as including any object that can be moved, including but not limited to, for example, aircraft, boats, spacecraft, cars, trucks, vans, semi-trailers, motorcycles, golf carts, off-road vehicles, vehicles, warehouse transport vehicles, or agricultural vehicles, and transport vehicles that run on tracks, such as trams or trains as well as other rail vehicles.

The "vehicle" and/or "movable object" in this application can generally include: a power system, a sensor system, a control system, peripheral equipment and a computer system. In some embodiments, the vehicle may include more, fewer, or different systems. Autonomous vehicles can have multiple control systems working integrally and/or independently to control various modules and subsystems of the vehicle, such as the drivetrain, power steering, vehicle sensors (e.g., engine temperature sensor, oil pressure sensor, etc.), environmental sensors to perceive the surroundings (e.g., radar, LIDAR, sonar, inertial measurement units including accelerometers and/or gyroscopes, etc.), braking system, and other modules and subsystems.

Among the systems of a vehicle, the power system is a system that provides power to the vehicle and generally includes engine/motor, transmission, wheels/tires, and a source of energy (e.g., gas in a gas tank). The control system may include a combination of devices that control the vehicle and its components, such as steering units, throttles, and braking units. Peripheral devices may be devices that allow the vehicle to interact with external sensors, other vehicles, external computing devices, and/or users, such as wireless communication systems, touch screens, microphones, and/or speakers.

An autonomous vehicle is typically also equipped with a sensor system and an unmanned driving control device. The sensor system may include multiple sensors for sensing information in the environment in which the vehicle is located, and one or more actuators for changing the position and/or direction of the sensors. The sensor system may include any combination of global positioning system (GPS) sensors, inertial measurement units (IMU), radio detection and ranging (RADAR) units, cameras, laser rangefinders, light detection and ranging (LIDAR) units and/or acoustic sensors. The sensor system may also include such sensors as $O_2$ monitor, fuel gauge, engine thermometer, etc.

The unmanned driving control device may include a processor and a memory, wherein at least one machine executable instruction is stored in the memory. When the processor executes the at least one machine executable instruction, it implements functionality of a map engine, a positioning module, a perception module, a navigation or path module, and/or an automatic control module as well as other functionality. The map engine and the positioning module are used to provide map information and positioning information. The perception module is used to perceive things in the environment of the vehicle according to the information obtained by the sensor system and the map information provided by the map engine. The navigation or path module is used to plan the driving path for the vehicle according to the processing results of the map engine, positioning module, and perception module. The automatic control module converts its decision-making information input and analysis information provided by the navigation or route module into control command outputs of the vehicle control system, and passes those command outputs over an internal electronic network system of the vehicle (e.g., a controller area network (CAN) bus, a local interconnection network, a multimedia directional system transmission, etc.). The internal electronic network system of the vehicle sends control commands to the corresponding components in the vehicle control system to implement automatic control of the vehicle. The automatic control module can also obtain information from each component in the vehicle through the network.

As shown in FIG. 1, on autonomous vehicles, especially autonomous trucks 10, LiDARs 101 and cameras 105 have become increasingly indispensable sensing elements. In order to achieve a good sensor collection effect, it is necessary to arrange the LiDARs 101 on the LiDAR brackets 102 on the left and right sides of the vehicle body to facilitate observation of the environment surrounding the vehicle. In addition, for example, a camera 105 may be provided on both sides of the camera bracket 104 of the vehicle to collect images in front of the vehicle and/or around the vehicle. In some geographic areas, there are often swarms of mosquitoes present on and around highways. When a vehicle is driving at a high speed, the mosquitoes will not have time to dodge and will hit and die on various surfaces of the vehicle including those of the vehicle's sensors.

Figure 2:
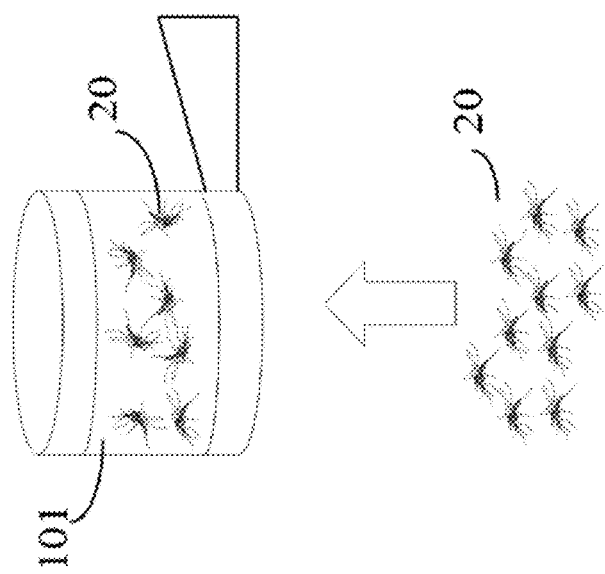
FIG. 2 illustrates a schematic diagram of mosquitoes hitting a glass screen of a light detection and ranging (LiDAR) device and blocking the LiDAR.
Figure 3:
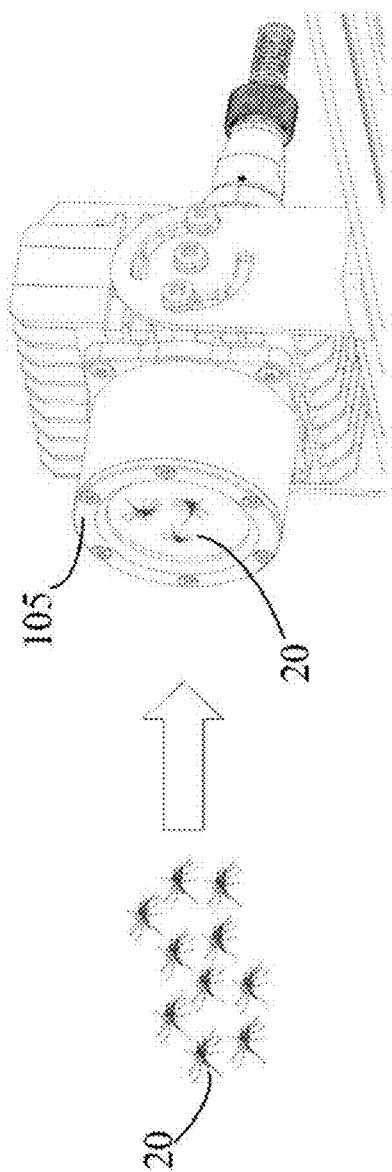
FIG. 3 illustrates a schematic diagram of mosquitoes hitting a surface of a lens of a camera and blocking the lens.

For example, the mosquito 20 shown in FIG. 2 hit and died on the glass screen of the LiDAR 101 thus blocking the field of view of the LiDAR 101, which affects the imaging of the LiDAR 101. In another example, the mosquito 20 shown in FIG. 3 hit and died on the lens surface of the camera 105, thus blocking a part of the camera's field of view. Moreover, when the vehicle is driving on a highway, it cannot stop to clean the mosquito corpse stuck on the sensor. After the vehicle reaches a destination, the cleaning staff needs to use a special cleaning fluid to clean the sensors of the vehicle, which causes an inconvenience in maintenance of the sensors. The addition of anti-insect nets on the vehicle will also block the sensors and thus is not a viable solution to this problem. Therefore, it is evident that there is currently no good solution to clean up or prevent mosquitoes from hitting the sensors of a vehicle.

Figure 4:
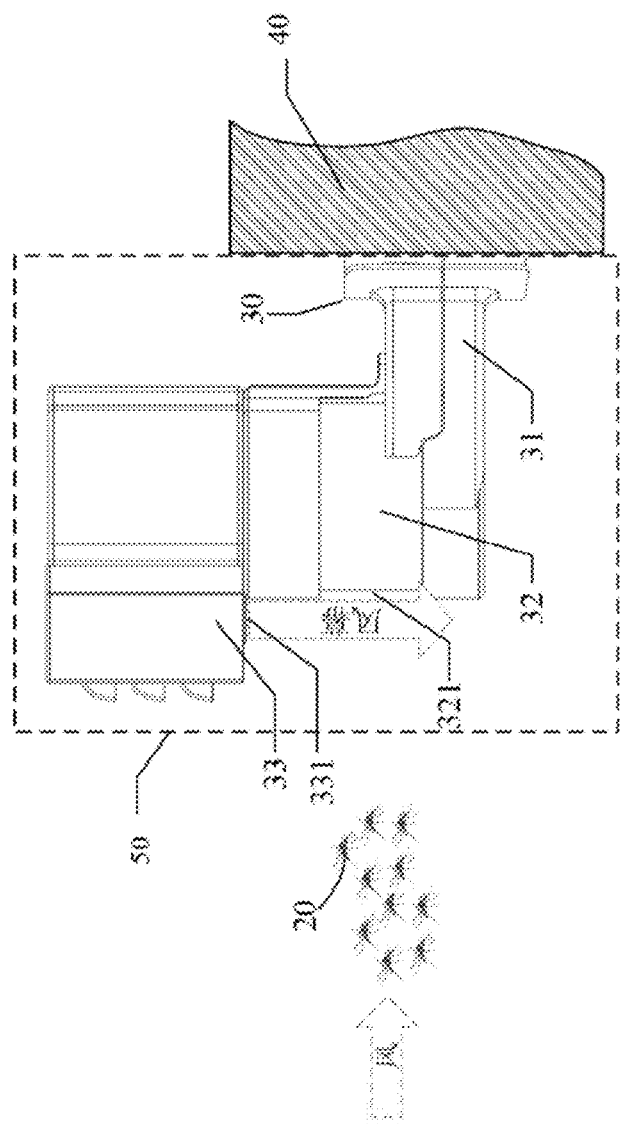
FIG. 4 illustrates a schematic diagram of an example embodiment of a sensor bracket according to the technology disclosed in this patent document.

In order to solve the above-mentioned defects, as shown in FIG. 4, an example embodiment of a sensor bracket 30 according to the technology disclosed in the present patent document is provided, which includes a bracket body 31, wherein a first end of the bracket body 31 is connected (either fixedly or removably) to a movable object 40, and a second end of the bracket body 31 is connected (either fixedly or removably) to a sensor 32. The second end of the bracket body 31 is also provided with one or more air curtain machines 33 (also referred to as "air curtains" below; although only one air curtain machine is depicted in FIG. 4, the disclosure of this patent document is not limited to such a case). In practical applications, one or more air curtains 33 can be provided on one or more sides of the sensor 32. An air exhaust port 331 of the air curtain 33 faces a front windward part 321 of the sensor 32 when the movable object 40 moves. The front windward part 321 of the sensor 32 is the one that is generally hit by an air flow created due to relative motion of the vehicle and air surrounding the vehicle when the vehicle moves. More generally, the air exhaust port 331 of the air curtain 33 can face a part of the sensor though which the sensor receives information from the outside world. Such a part can be a lens of a video camera, for example, or a part of the lens of the video camera, as another example. The air curtain machine 33 creates a flow of air through the air exhaust port 331 such that the created air flow goes proximate to the part of the sensor 32 that the air exhaust port is facing. More generally, the air exhaust port 331 of the air curtain 33 is oriented such that an air flow created by the air curtain 33 and coming from the air exhaust port 331 of the air curtain 33 is directed across a forward-facing direction of the sensor 32, for example, or flows along a part of the sensor 32. The air flow produced by the air curtain machine protects the sensor 32 from being hit by various objects such as mosquitoes, flies, dust, debris, rain drops, etc. that can be present around the vehicle, by moving such objects away from the sensor and along the direction of the air flow produced by the air curtain machine 33. The sensor 32 above may be a LiDAR 322 or a camera 323, for example, as well as may also be a sensor in other autonomous driving fields. Although the example embodiments described below include a LiDAR device as the sensor element, similar techniques could be used for other sensor elements such as a camera.

Figure 5:
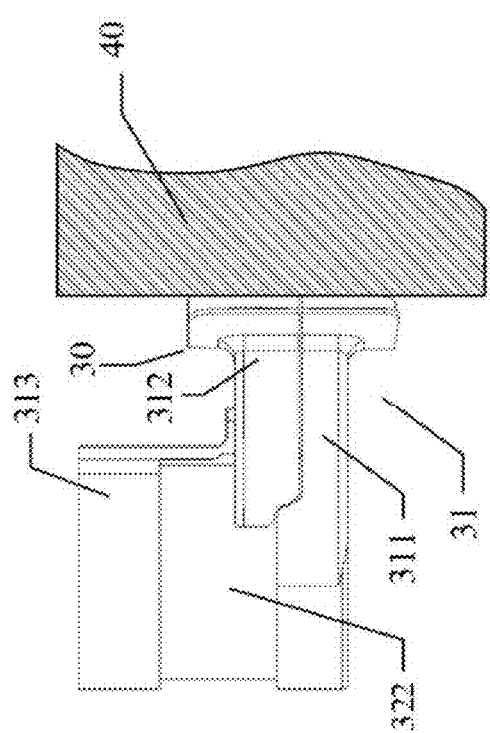
FIG. 5 illustrates a schematic diagram of another example embodiment of a sensor bracket according to the technology disclosed in the present patent document.

In an example embodiment of the sensor bracket 30 according to the technology disclosed in this patent document, as shown in FIG. 5, the sensor 32 is a LiDAR 322; the bracket body 31 includes a LiDAR lower mounting cover 311, a LiDAR upper mounting cover 312, and a LiDAR upper shield 313. The LiDAR lower mounting cover 311 is arranged on the lower side of the LiDAR 322 to hold the LiDAR 322, the LiDAR upper mounting cover 312 is arranged on a rear side of the LiDAR 322 (the side that is generally opposite to the one that a sensing area of the LiDAR 322 is facing to detect light), and the LiDAR upper shield 313 is arranged on top of the LiDAR and/or around the upper side of the LiDAR 322. The upper mounting cover 312 is connected (either fixedly or removably) to the lower mounting cover 311 using screws or any other type of a mechanical connection mechanism. The upper mounting cover 312 and/or the lower mounting cover 311 are connected to the movable object 40 on the side away from the LiDAR 322. The upper shield 313 is connected to the upper mounting cover 312 by, for example, a bolt connection or any other type of a mechanical connection. The LiDAR upper shield 313 and the lidar lower mounting cover 311 cooperate to fix the lidar 322 in the space between the LiDAR upper shield 313 and the LiDAR lower mounting cover 311. The sensing area of the LiDAR 322 is exposed in the space between the upper shield 313 and the lower mounting cover 311.

Figure 6:
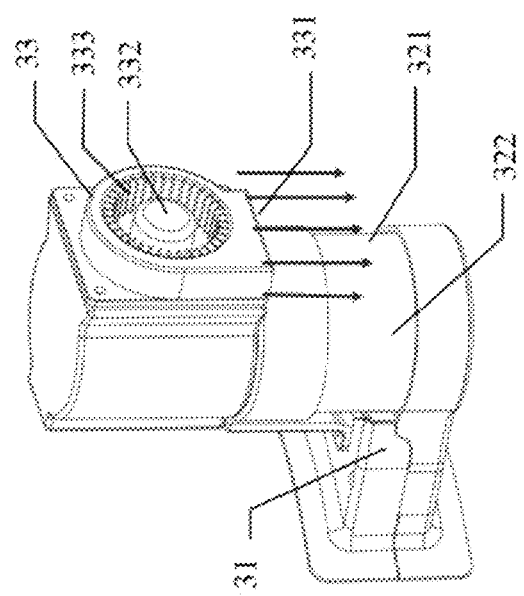
FIG. 6 illustrates a schematic diagram of yet another example embodiment of a sensor bracket according to the technology disclosed herein.

Further, in an example embodiment of the sensor bracket 30 according to the disclosed technology, the air curtain machine 33 can be arranged on the upper side of the LiDAR 322. As shown in FIG. 6, the air curtain 33 is arranged at the second end of the bracket body 31. The air outlet 331 of the air curtain 33 faces downward toward the front windward portion 321 of the LiDAR 322. In this arrangement, the air curtain machine 33 can generate a high-speed airflow downwards to blow foreign objects such as mosquitoes, sand, rain, etc. away from the front windward part 321 to prevent foreign objects from hitting and adhering to the LiDAR 322.

Figure 7:
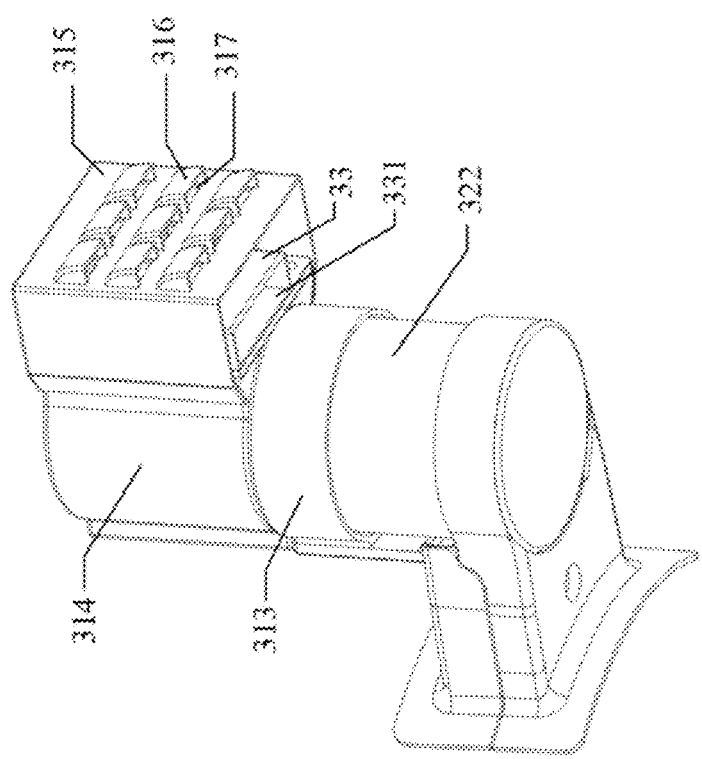
FIG. 7 illustrates a schematic diagram of an example embodiment of a sensor bracket according to the disclosed technology.
Figure 8:
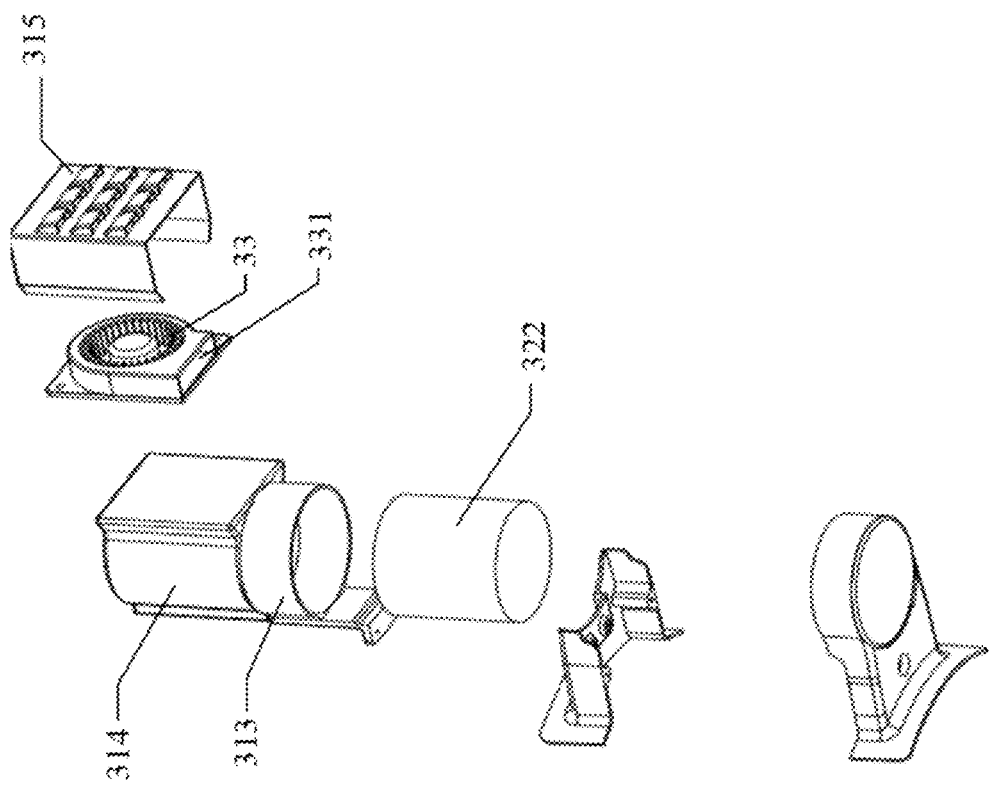
FIG. 8 illustrates a schematic diagram of an exploded view of the structure of an example embodiment of a sensor bracket according to the technology disclosed in the present patent document.

In an example embodiment of the of the sensor bracket 30, as shown in FIG. 7 and FIG. 8, an air curtain installation cover 314 is connected to the upper end of the upper shield 313, and the air curtain 33 is installed on an outer surface of the air curtain installation cover 314. The air curtain 33 is further provided with an air curtain protective cover 315. The air curtain protective cover 315 cooperates with the air curtain installation cover 314 to surround the air curtain 33. The air curtain protective cover 315 covers the windward side of the air curtain 33. The air curtain protective cover 315 is provided with an opening that is generally located in front of the air outlet 331 of the air curtain machine 33. The air curtain protective cover 315 allows the air discharged from the air outlet 331 of the air curtain 33 escape, through the opening in the air curtain protective cover 315, the volume covered by the air curtain protective cover 315 within which the air curtain 33 is located. In this configuration, the overall position of the air curtain machine installation cover 314 is above the LiDAR 322, so that the LiDAR 322 is protected by the air flow created by the air curtain machine 33 that goes through the air outlet 331 as well as through the opening in the air curtain protective cover 315 and is directed along the sensing area of the LiDAR 322.

Figure 9:
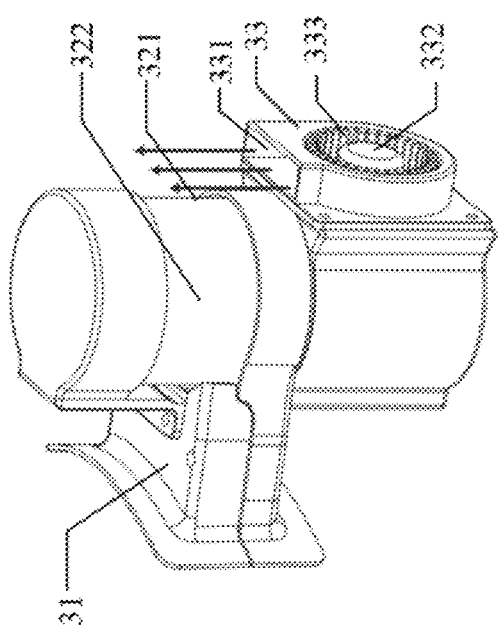
FIG. 9 illustrates a schematic diagram of an example embodiment of a sensor bracket according to the disclosed technology.

In addition, in an example embodiment of the of the sensor bracket 30, the air curtain 33 may be located under the LiDAR 322. As shown in FIG. 9, the air curtain 33 is provided at the second end of the bracket body 31 and is located on the lower side of the lidar 322. As shown in FIG. 9, the air outlet 331 of the air curtain 33 faces upward toward the front windward portion 321 of the LiDAR 322. In this arrangement, the air curtain 33 can generate a high-speed airflow upwards to blow foreign objects such as mosquitoes, sand, and rainwater away from the front windward portion 321, to prevent the foreign objects from hitting and adhering to the LiDAR 322.

Figure 10:
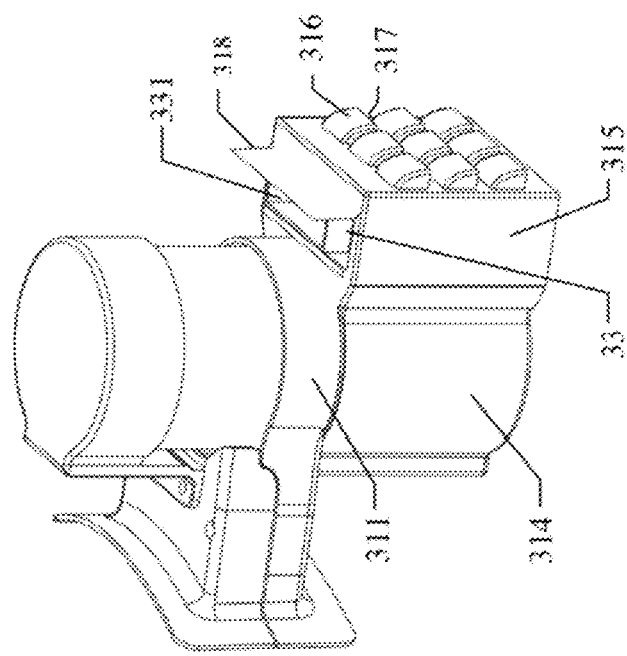
FIG. 10 illustrates a schematic diagram of another example embodiment of a sensor bracket according to the disclosed technology.

In an embodiment of the of the sensor bracket according to the technology disclosed in the present application, as shown in FIG. 10, the air curtain installation cover 314 is connected to the lower side of the lower mounting cover 311, and the air curtain 33 is installed on the air curtain installation cover 314. The air curtain 33 is provided with the air curtain protective cover 315. The air curtain protective cover 315 and the air curtain installation cover 314 cooperate to enclose the air curtain 33, such that the air curtain protective cover 315 is on top of the air curtain 33. The air curtain protective cover 315 is provided with an opening that is generally located in front of the air outlet 331 of the air curtain machine 33. The air curtain protective cover 315 allows the air discharged from the air outlet 331 of the air curtain 33 escape, through the opening in the air curtain protective cover 315, the volume confined between the air curtain protective cover 315 and the air curtain installation cover 314 within which the air curtain 33 is located. In this configuration, the overall position of the air curtain machine installation cover 314 is below the LiDAR 322, so that the LiDAR 322 is protected by the air flow created by the air curtain machine 33 that passes through the air outlet 331 as well as through the opening in the air curtain protective cover 315 and is directed along the sensing area of the LiDAR 322.

Figure 11:
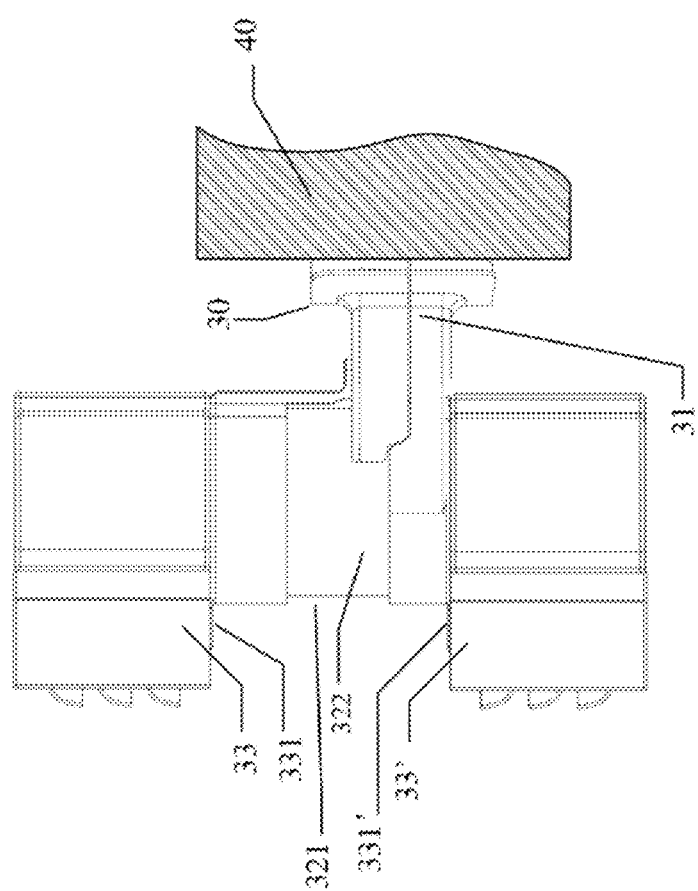
FIG. 11 illustrates a schematic diagram of yet another example embodiment of a sensor bracket according to the technology disclosed herein.

In another example embodiment of the sensor bracket according to the disclosed technology, as shown in FIG. 11, the second end of the bracket body 31 may be provided with two air curtains 33 and 33'. The air curtain 33 is provided on the upper side of the LiDAR 322, and the air outlet 331 of the air curtain 33 faces downwards toward the front windward portion 321 of the LiDAR 322. The air curtain 33' is arranged on the lower side of the lidar 322, and the air outlet 331' of the air curtain 33' faces upward toward the front windward portion 321 of the LiDAR 322. In this arrangement of the air curtains, the two air curtains can respectively generate high-speed airflow upwards and downwards to blow foreign objects such as mosquitoes, sand, rain, etc. away from the front windward portion 321 of the LiDAR 322 to prevent foreign objects from hitting and adhering to the LiDAR 322.

Figure 12:
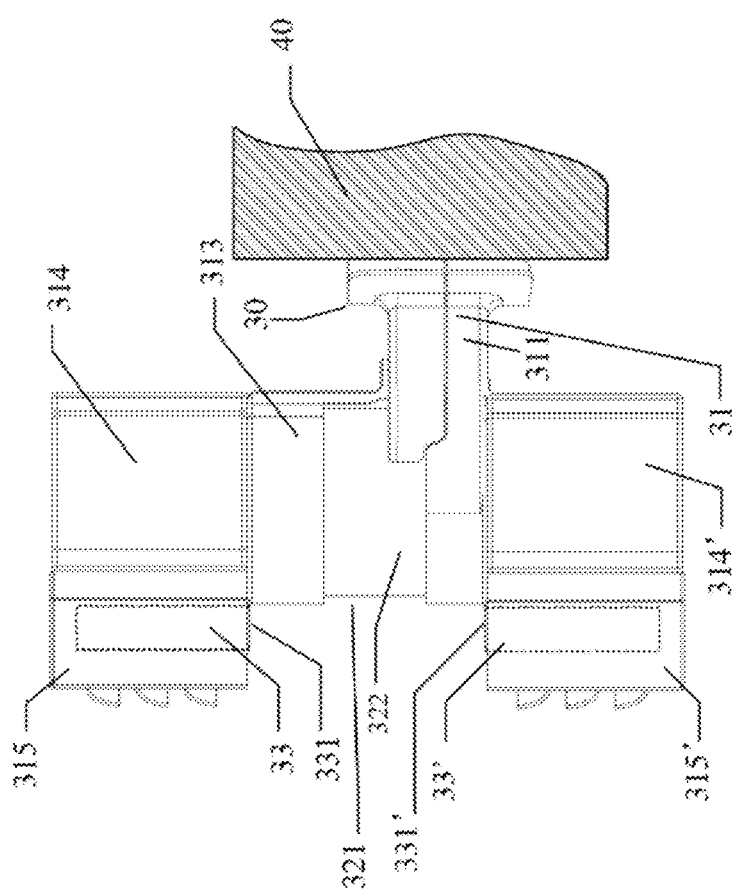
FIG. 12 illustrates a schematic diagram of an example embodiment of a sensor bracket according to the technology disclosed in this patent document.

In yet another example embodiment of the sensor bracket, as shown in FIG. 12, a first air curtain installation cover 314 is connected to the upper end of the upper shield 313, and a first air curtain 33 is installed on the outside of the first air curtain installation cover 314. A first air curtain protective cover 315 is arranged above the first air curtain 33. The first air curtain protective cover 315 cooperates with the first air curtain installation cover 314 to surround the first air curtain 33. The first air curtain protective cover 315 is provided with an opening in front of the air outlet 331 of the first air curtain machine 33. In addition, a second air curtain installation cover 314' is connected to the lower end of the LiDAR lower mounting cover 311, and a second air curtain 33' is arranged on the outside of the second air curtain installation cover 314'. The air curtain 33' is provided with a second air curtain protective cover 315'. The second air curtain protective cover 315' cooperates with the second air curtain installation cover 314' to surround the second air curtain 33'. The air curtain protective cover 315' is provided with an opening in front of the air outlet 331' of the second air curtain machine 33'.

In an embodiment of the sensor bracket according to the technology disclosed herein, as shown in FIG. 7 and FIG. 10, a plurality of ventilation holes 316 (also referred to as vents) is provided on the outside of the air curtain protective cover 315. For example, the plurality of waterproof ventilation holes 316 includes a plurality of raised structures on the outer side of the air curtain protective cover 315, and a through hole 317 is provided on the lower side of each structure in the plurality of raised structures. The though hole 317 connects the space confined between the air curtain protective cover 315 and the air curtain installation cover 314, within which the air curtain 33 is located, to the environment outside the air curtain protective cover 315. The through hole 317 is facing downward or, more generally, in a direction substantially orthogonal to the direction of the vehicle travel. Such orientation of the through hole 317 can prevent rainwater from entering the air curtain protective cover 315, which protects the air curtain 33, and can also play a role in supplementing air for the air curtain 33.

Also, as shown in FIGS. 7 and 10, cross sections of the air outlet 331 of the air curtain 33 and the air curtain protective cover 315 are elongated along one directional axis and have a shape of, for example, rectangular strips or oblong strips, but are not limited to such shapes. Setting the air outlet 331 in a rectangular strip shape or an oblong strip shape can facilitate the concentration of air flow and is more beneficial to the formation of a high-speed airflow.

In addition, as shown in FIG. 10, a baffle 318 can be provided at the air outlet 331 of the air curtain 33 (a baffle can also be provided at the air outlet 331 in FIG. 7, yet is not shown in FIG. 7). The baffle 318 at the air outlet 331 of the air curtain 33 can be pushed open under a force created by the air flow produced by the air curtain 33 and can be closed when the air curtain is not creating the air flow. The baffle 318 can be connected to the air outlet 331 of the air curtain 33 by means of a light spring or other spring-like mechanisms or mechanism of another suitable type, so that when the air comes out of the air outlet 331, the baffle 318 is pushed open by the air flow and when there is no air flow, the baffle will be pulled back by the action of the light spring, for example, and will cover the air outlet 331. The baffle 318 can be also attached to the air curtain protective cover 315 instead of the air curtain 33 and can open the opening in the protective cover 315 in front of the air outlet 331 of the air curtain 33 to let the air flow created by the air curtain 33 flow outside the air curtain protective cover 315. When the air curtain 33 does not produce the air flow, the baffle 318 can be pulled back by a spring or any other suitable mechanism and cover the opening in the protective cover 315 and close the space under the air curtain protective cover 315 housing the air curtain 33. In such a manner, the baffle can protect the air curtain machine 33 when the machine does not produce an air flow, and prevent sand, rain, mosquitoes, etc. from entering the air curtain machine and affecting its subsequent performance.

In addition, as shown in FIGS. 6 and 9, the air curtain 33 may include a motor 332 and a fan impeller 333. The motor 332 drives the fan impeller 333 to rotate. Following rotation of the fan impeller 333, the gas between the blades of the fan impeller 333 also rotates and is thrown out of the impeller under the action of the centrifugal force, thus creating an air flow through the air outlet 331 of the air curtain 33. Note that an air flow through the air outlet 331 of the air curtain 33 can be created by means other than the mentioned motor and impeller. The air flow generated through the air outlet 331 continues as a protective air flow along the front windward part 321 of the LiDAR 322. For example, if the air flow velocity is greater than 20 m/s, the foreign matter such as insects, rain drops, dust, debris, etc. present around the LiDAR 322 can be led by the protective air flow away from the front windward part 321 of the LiDAR 322. In some embodiments, the width of the air outlet 331 is greater than or is equal to the width of the LiDAR 322, such that the width of the air flow created by the air curtain machine 33 is also greater than or is equal to the width of the LiDAR 322 so that the mentioned foreign objects such as mosquitoes, sand, rain, etc. that can hit the LiDAR 322 can be effectively blown away from the LiDAR 322 and prevented from hitting and adhering to the surface of the LiDAR 322. The "width" above generally corresponds to a dimension in a direction substantially orthogonal to a direction of travel of a moving object (e.g., a vehicle) having the LiDAR 322 and the air curtain machine 33 installed on it.

Figure 13:
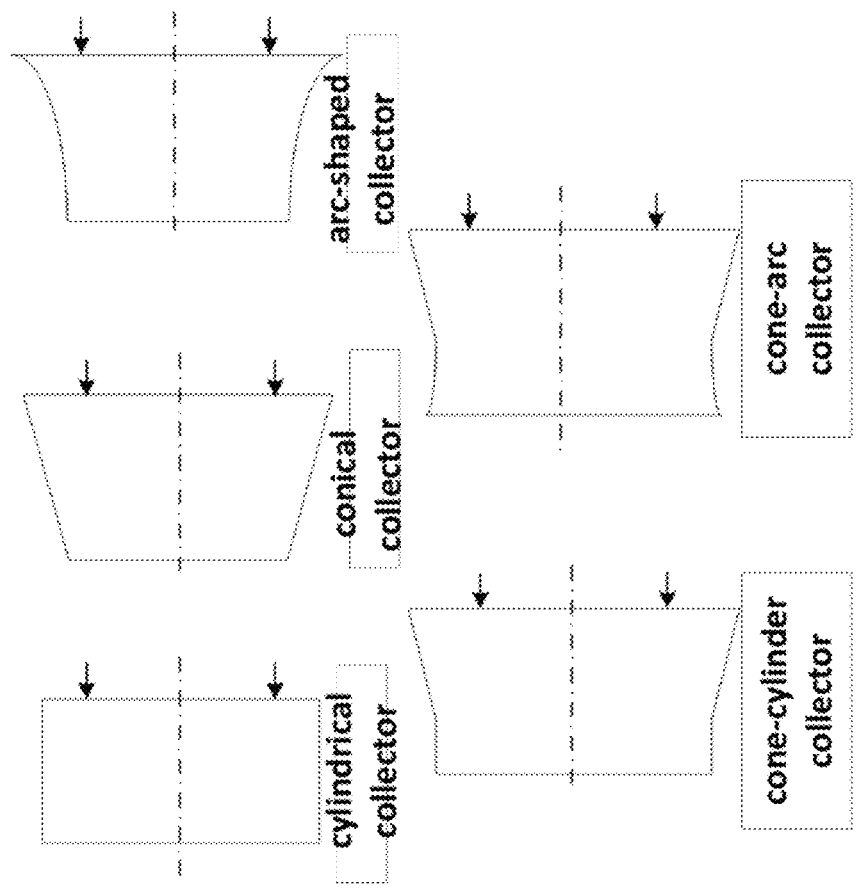
FIG. 13 illustrates schematic diagrams of various types of air flow collectors according to example embodiments of the disclosed technology.

In addition, an air flow collector 319 may be provided at the air outlet 331 of the air curtain machine 33. The air flow collector 319 can increase the speed of the air flow formed by the air curtain machine 33 through the air outlet 331. For example, as shown in FIG. 13, the air flow collector 319 may have a cylindrical, conical, arc-shaped, cone-cylinder, or cone-arc cross section, but the shape of the cross section of the flow collector 319 is not limited to these shapes.

According to the technology disclosed in the present patent document, as shown in FIG. 4, there is also provided a sensor assembly 50, including a sensor 32 and a sensor bracket 30. The sensor bracket 30 includes a bracket body 31, wherein a first end of the bracket body 31 is connected (e.g., fixedly) to a moving object 40 and a second end of the bracket body 31 is connected (e.g., fixedly) to the sensor 32. The second end of the bracket body 31 is also provided with one or more air curtains 33, such that the one or more air curtains 33 are arranged on one or more sides of the sensor 32. The air exhaust port 331 of at least one of those air curtains 33 faces a portion of the sensor 32, e.g. a front windward part 321 of the sensor 32. In this way, by forming a wind curtain on the front windward part of the sensor, it is possible to effectively prevent mosquitoes and other foreign objects from hitting and adhering to the sensor, thus affecting the sensor's perception, when moving objects, such as vehicles, that are equipped with the sensor assembly are traveling at high speeds.

The sensor 32 may be a LiDAR 322 or a camera 323, but is not limited to these types of sensors, and may also be a sensor used in other autonomous driving fields.

In an example embodiment of the sensor assembly 50, as shown in FIG. 5, the sensor 32 is the LiDAR 322, the bracket body 31 includes a LiDAR lower mounting cover 311, a LiDAR upper mounting cover 312, and a LiDAR upper shield 313. The lower mounting cover 311 is arranged on the lower side of the LiDAR 322 to support and/or hold the LiDAR 322. The upper mounting cover 312 is arranged on a rear side of the LiDAR 322 which is generally opposite to the side of the LiDAR 322 used for sensing purposes. And the upper shield 313 is arranged on top of the LiDAR and/or around the upper part of the LiDAR 322. The upper mounting cover 312 is attached or connected to the lower mounting cover 311. The upper mounting cover 312 and/or the lower mounting cover 311 are also connected to the movable object 40 on the side away from the LiDAR 322. The upper shield 313 is connected to the upper mounting cover 312 (via, for example, a bolt connection or any other type of a mechanical connection). The upper shield 313 and the lower mounting cover 311 cooperate to fix the LiDAR 322 in the space between the upper shield 313 and the lower mounting cover 311. The sensing area of the LiDAR 322 is exposed in the space between the upper shield 313 and the lower mounting cover 311.

According to an example embodiment of the sensor assembly 50, the air curtain 33 can be arranged on the upper side of the LiDAR 322. As shown in FIG. 6, the air curtain 33 is arranged at the second end of the bracket body 31. The air outlet 331 of the air curtain 33 faces downward toward the front windward part 321 of the LiDAR 322. In such an arrangement, the air curtain 33 can generate a high-speed air flow downwards to move foreign objects such as mosquitoes, sand, rain, etc. away from the front windward part 321 of the LiDAR 322 to prevent those foreign objects from hitting and adhering to the LiDAR 322.

According to another example embodiment of the sensor assembly 50, as shown in FIG. 7 and FIG. 8, an air curtain installation cover 314 is connected to the upper side of the LiDAR upper shield 313, and the air curtain 33 is installed on the air curtain installation cover 314 on an outside surface of the installation cover 314. The air curtain 33 is covered by an air curtain protective cover 315 which cooperates with the air curtain installation cover 314 to surround the air curtain 33. The air curtain machine 33 is provided with an air outlet 331 and the air curtain protective cover 315 is provided with an opening that is generally positioned in front of the air outlet 331 in order to let the air flow from the air outlet 331 escape the protective cover 315. In such an arrangement, the overall position of the air curtain machine installation cover 314 is above the LiDAR 322, so the LiDAR 322 is also protected by a downward air flow produced by the air curtain machine 33.

According to yet another example embodiment of the sensor assembly 50, the air curtain 33 may be arranged under the LiDAR 322. As shown in FIG. 9, the air curtain 33 is provided at the second end of the bracket body 31. The air curtain 33 is arranged on the lower side of the LiDAR 322, and the air outlet 331 of the air curtain 33 faces upward toward the front windward portion 321 of the LiDAR 322. In this way, the air curtain 33 can generate a high-speed airflow upwards to blow foreign objects such as mosquitoes, sand, and rainwater away from the front windward portion 321 to prevent the foreign objects from hitting and adhering to the LiDAR 322.

According to some example embodiments of the sensor assembly 50, as shown in FIG. 10, the air curtain installation cover 314 is connected to the lower end of the LiDAR lower mounting cover 311, and the air curtain 33 is installed on an outside surface of the air curtain installation cover 314. The air curtain 33 is provided with an air curtain protective cover 315, wherein the air curtain protective cover 315 and the air curtain installation cover 314 cooperate to surround and cover the air curtain 33. The air curtain machine 33 is provided with an air outlet 331 and the air curtain protective cover 315 is provided with an opening to let the air flow from the air outlet 331 escape the protective cover 315.

According to some example embodiments of the sensor assembly 50, as shown in FIG. 11, the second end of the bracket body 31 may be provided with two air curtains 33 and 33'. The air curtain 33 is provided on the upper side of the LiDAR 322 and the air outlet 331 of the air curtain 33 faces downward and toward the front windward portion 321 of the LiDAR 322. The air curtain 33' is arranged on the lower side of the LiDAR 322, and the exhaust port 331' of the air curtain 33' faces upward toward the front windward portion 321 of the LiDAR 322. In this arrangement, the two air curtains can respectively generate high-speed air flow upwards and downwards to blow foreign objects such as mosquitoes, sand, rain, etc. away from the front windward part 321 in order to prevent the foreign objects from hitting and adhering to the LiDAR 322.

According to an example embodiment of the sensor assembly 50, as shown in FIG. 12, an air curtain installation cover 314 is connected to the upper side of the LiDAR upper shield 313, and an air curtain 33 is attached to the air curtain installation cover 314 (e.g., the air curtain can be attached to a side surface of the air curtain installation cover 314). An air curtain protective cover 315 is arranged above the air curtain 33 to cover the air curtain 33. The air curtain protective cover 315 cooperates with the air curtain installation cover 314 to enclose the air curtain 33. The air curtain protective cover 315 is provided with an opening that is aligned with the air outlet 331 of the air curtain 33 to let the air from the air outlet 331 pass through the opening (the opening can be, for example, in front of the air outlet 331 of the air curtain 33 yet other relative alignments between the opening and the air outlet 331 of the air curtain 33 are possible). In addition, a second air curtain installation cover 314' is connected to the lower end of the lower mounting cover 311, and an air curtain 33' is attached to the outer surface of the air curtain installation cover 314'. An air curtain protective cover 315' is arranged on the outside of the air curtain 33' to cover the air curtain 33'. The air curtain protective cover 315' cooperates with the air curtain installation cover 314' to surround an air curtain 33'. The air curtain protective cover 315' is provided with an opening to let the air from the air outlet 331' of the air curtain 33' escape the protective cover 315'.

According to an example embodiment of the sensor assembly 50, as shown in FIG. 7 and FIG. 10, a plurality of ventilation holes (more generally, openings) 316 is provided on the air curtain protective cover 315. For example, the plurality of ventilation holes 316 has a plurality of raised structures on the outer side of the protective cover 315, and a through hole 317 is provided on the lower side of each raised structure. Each through hole connects the volume between the air curtain protective cover 315 and the air curtain installation cover 314, in which the air curtain 33 is installed, to the space outside that volume. The air around the sensor assembly 50 can be drawn into the air curtain 33 through the ventilation holes 316 in the air curtain protective cover 315 when the air curtain 33 creates an air flow through the air outlet 331 of the air curtain 33. The through holes 317 are facing downward, which can prevent rainwater from entering the air curtain protective cover 315, thus protecting the air curtain 33, and also plays a role in supplementing air for the air curtain 33 during air curtain operation.

In addition, in some example embodiments of the sensor assembly 50, as shown in FIGS. 7 and 10, cross sections of the air outlet 331 of the air curtain 33 and the air curtain protective cover 315 are elongated along one direction compared to a direction orthogonal to the one direction and can have a shape of, for example, rectangular strips or oblong strips, but are not limited to such shapes. Setting the air outlet 331 in a rectangular strip shape or an oblong strip shape can facilitate the concentration of the air flow produced by the air curtain 33 and is beneficial to the formation of a high-speed air flow.

In addition, in some example embodiments of the sensor assembly 50, as shown in FIG. 10, a baffle 318 can be provided at the air outlet 331 of the air curtain 33 (a baffle can also be provided at the air outlet 331 shown in FIG. 7). The baffle 318 at the air outlet 331 of the air curtain 33 can be pushed open under a force created by the air flow produced by the air curtain 33 and can be closed when the air curtain is not creating the air flow. The baffle 318 can be connected to the air outlet 331 of the air curtain 33 by means of a light spring or other spring-like mechanisms or mechanism of another suitable type, so that when the air comes out of the air outlet 331, the baffle 318 is pushed open by the air flow and when there is no air flow, the baffle will be pulled back by the action of the light spring, for example, and will cover the air outlet 331. The baffle 318 can be also attached to the air curtain protective cover 315 instead of the air curtain 33 and can open the opening in the protective cover 315 in front of the air outlet 331 of the air curtain 33 to let the air flow created by the air curtain 33 flow outside the air curtain protective cover 315. When the air curtain 33 does not produce the air flow, the baffle 318 can be pulled back by a spring or any other suitable mechanism and cover the opening in the protective cover 315 and close the space under the air curtain protective cover 315 housing the air curtain 33. In such a manner, the baffle can protect the air curtain machine 33 when the machine does not produce an air flow, and prevent sand, rain, mosquitoes, etc. from entering the air curtain machine and affecting its subsequent performance.

In some example embodiments of the sensor assembly 50, as shown in FIGS. 6 and 9, the air curtain 33 may include a motor 332 and a fan impeller 333. The motor 332 can drive the fan impeller 333 to rotate. In some embodiments, the motor 332 may be electrically coupled to the power system of the vehicle. In some embodiments, the motor 332 may receive a signal from the autonomous vehicle indicative of a current speed of the vehicle such that the motor can calculate air speed to be used for the air curtain, as further described in the present document.

Following rotational motion of the fan impeller 333, the gas between the blades of the fan impeller 333 will also move and will be thrown out of the impeller under the action of the centrifugal force, thus creating an air flow through the air outlet 331 of the air curtain 33. The fan impeller 333 may be designed to have a corrugated surface such that the surface variations increase its surface area and provide a greater thrust to force air flow out into the air curtain.

The air flow coming from the air outlet 331 continues as a protective air flow along the front windward part 321 of the LiDAR 322. For example, if the air flow velocity is greater than about 20 m/s, the foreign matter such as insects, rain drops, dust, debris, etc. present around the sensor assembly 50 can be led by the protective air flow away from the front windward part 321 of the LiDAR 322. In some embodiments, the width of the air outlet 331 is greater than or is equal to the width of the LiDAR 322, such that the width of the air flow created by the air curtain machine 33 is also greater than or is equal to the width of the LiDAR 322 so that the mentioned foreign objects such as mosquitoes, sand, rain, etc. that can hit the LiDAR 322 can be blown away from the LiDAR 322, which can effectively prevent foreign objects from hitting and adhering to the surface of the LiDAR 322.

In some example embodiments of the sensor assembly 50, an air flow collector 319 may be provided at the air outlet 331 of the air curtain machine 33, and the air flow collector 319 can increase the speed of the air flow formed by the air curtain machine 33 through the air outlet 331. For example, as shown in FIG. 13, the air flow collector 319 may have a cylindrical, conical, arc-shaped, cone-cylinder, or cone-arc cross section, but the shape of the cross section of the flow collector 319 is not limited to these shapes.

Figure 14:
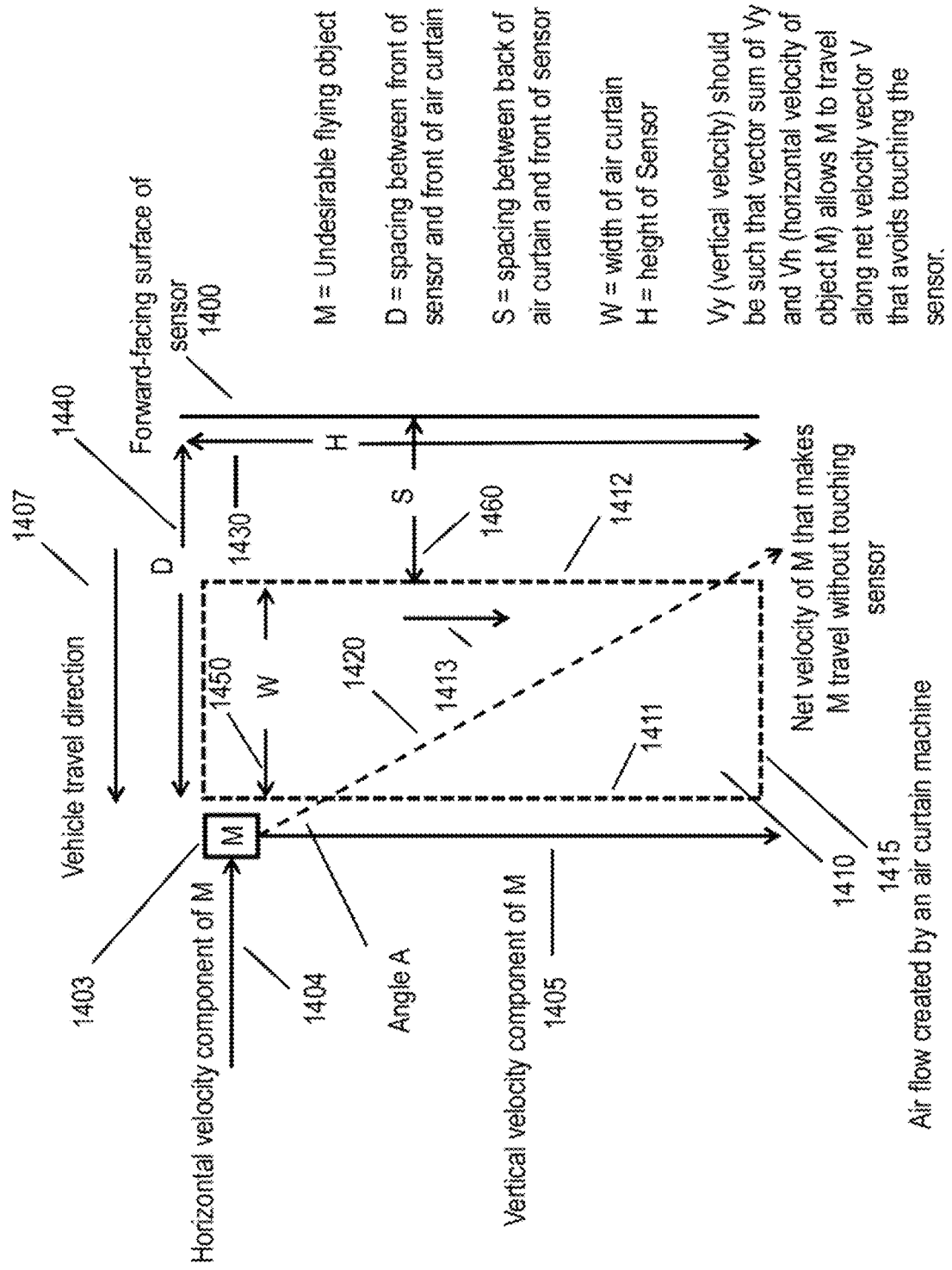
FIG. 14 illustrates a schematic diagram showing certain dimensions and velocities in a system including an undesirable flying object, a forward-facing surface of a sensor, and an air flow created by an air curtain machine.

FIG. 14 illustrates a schematic diagram showing certain dimensions and velocities in a system including an undesirable flying object M (e.g., a mosquito; 1403 in FIG. 14), a forward-facing surface 1400 of a sensor (e.g., that of a LiDAR sensor), and an air flow 1410 created by an air curtain machine. As shown in FIG. 14, the forward-facing surface 1400 of a sensor that should be protected from any undesirable objects sticking to it and blocking a field of view of the sensor has a height H (1430). As also shown in FIG. 14, the air flow 1410 produced by the air curtain machine generally occupies a space 1415 in front of the forward-facing surface 1400 of the sensor such that the space 1415 is separated from the forward-facing surface 1400 of the sensor by a gap of a width S (1460), and has a width W (1450) between a back (1412) and a front (1411) surfaces of the space 1415. The surfaces 1411 and 1412 generally face a direction of travel (1407) of a vehicle carrying the sensor and the air curtain machine. The distance D (1440) between the front surface 1411 of the space 1415 and the forward-facing surface 1400 of the sensor is generally equal to a sum of the values of S and W.

The arrow 1413 in FIG. 14 shows a direction in which the air is expelled from an air outlet of the air curtain machine. As shown in FIG. 14, that direction is generally parallel to the forward-facing surface 1400 of the sensor and is generally collinear with a vertical direction. The incoming undesirable object 1403 has a velocity 1404 relative to the moving vehicle in a horizontal direction (that generally coincides with the direction of the vehicle travel). Before entering the air flow generated by the air curtain machine, the incoming undesirable flying object 1404 also has a velocity relative to the moving vehicle in the vertical direction. That velocity, however, is typically much smaller compared to the velocity 1404 in the case when the object M is a mosquito, for example, and the velocity component of the vehicle along the vertical direction is negligible (we will assume that the object M is a mosquito below). When the undesirable object 1403 gets into the space 1415 where the air flow created by the air curtain machine exists, it begins to accelerate along the direction 1413 of the air flow and, relatively quickly, its speed in that direction reaches that of the air flow. Simultaneously, the object 1403 continues to travel along the horizontal direction towards the forward-facing surface 1400 of the sensor.

In order for the object to miss the sensor (whether the object is a mosquito or not), it needs to travel the distance H in the vertical direction faster than it travels the distance D in the horizontal direction. This is shown by the dashed line labeled "net velocity of M that makes M travel without touching sensor." This trajectory forms an angle A with respect to the vertical direction. Here we assume the scenario when the object 1403 enters the space 1415 close to the top of the forward-facing surface 1400 of the sensor. We also assume that the back surface 1412 of the space 1415 coincides with the forward-facing surface 1400 of the sensor (e.g., W=D). Let's further assume that the average vertical component of the object velocity 1405 under the influence of the air flow has a magnitude $V_{MV}$ and the average horizontal component of the object's velocity has a magnitude $V_{MH}$. If, as in the case when the object M is a mosquito, we further assume that $V_{MV}$ is close to the air flow speed in the vertical direction ($V_A$), and the $V_{MH}$ is close to the speed of the vehicle travel ($V_V$) than the object will miss the sensor when if $D/V_V > H/V_A$, as discussed above. If there is a gap S between the back surface of the space 1415 and the forward-facing surface 1400 of the sensor, then one would need to correct for that by, for example, substituting D with W in the formula above to obtain an estimate of the air flow velocity required to prevent the object M from hitting the sensor. As an example, if the travel speed of a vehicle in a horizontal direction is 100 km/hour, the height H of the forward-facing surface 1400 of the sensor is 10 cm, the width W of the air flow is 10 cm, than the speed of the air flow needs to be greater than $H*V_V/D$ or 100 km/hour (~28 m/s). As another example, if the travel speed of a vehicle in a horizontal direction is 100 km/hour, the height H of the forward-facing surface 1400 of the sensor is 10 cm, the width W of the air flow is 3 cm, than the speed of the air flow needs to be greater than $H*V_V/D$ or 300 km/hour (~100 m/s). In some embodiments, a controller for the sensor motor may receive vehicle speed information in real-time from the autonomous vehicle and compute an amount of torque to be applied to the motor to force the velocity of air flow that is pushed out by the air curtain machine in order to achieve the above-discussed trajectory for undesirable objects.

Figure 15:
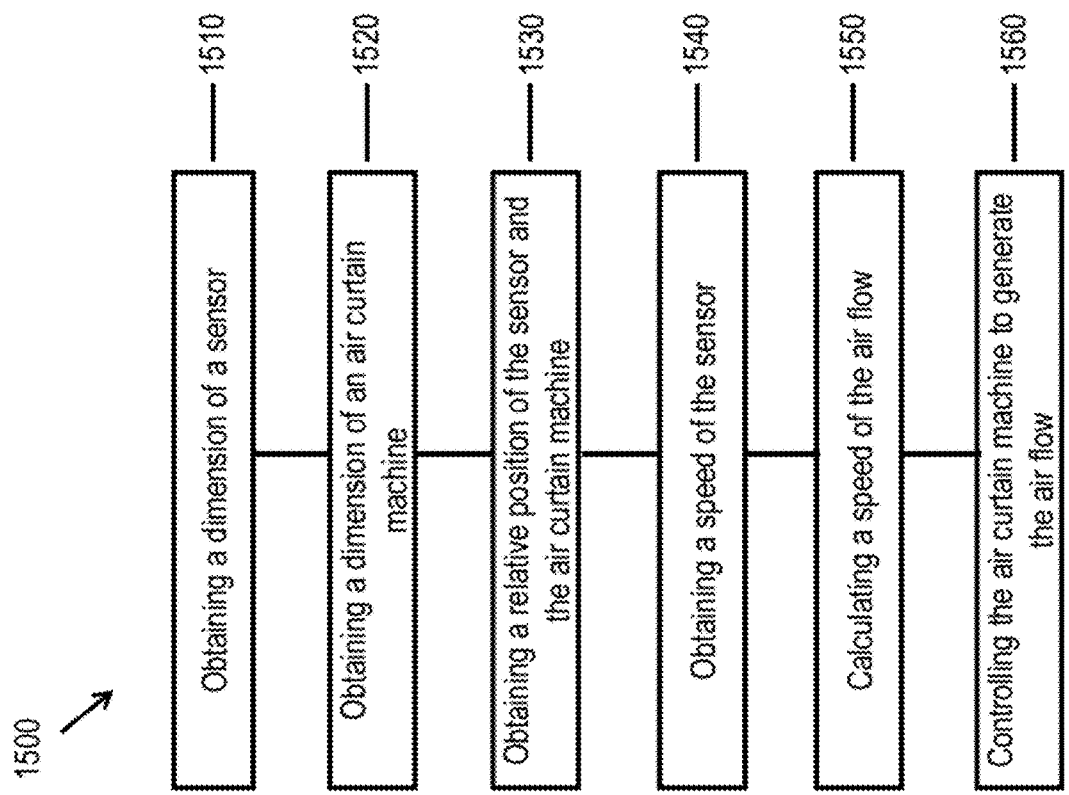
FIG. 15 illustrates a schematic diagram of a method of generating an air flow in an air curtain machine according to the disclosed technology.

FIG. 15 shows an example embodiment of a method of controlling a speed of the air flow produced by an air curtain machine according to an example embodiment of the disclosed technology. The method 1500 includes a step 1510 of obtaining at least one dimension of a sensor equipped with the air curtain machine, a step 1520 of obtaining at least one dimension of the air curtain machine, step 1530 of obtaining at least one distance value related to a relative position of the sensor and the air curtain machine, step 1540 of obtaining a value related to a velocity of travel of the sensor equipped with the air curtain, step 1550 of obtaining a value for a speed of the air flow that is to be generated by the air curtain machine in order to prevent an object from hitting the sensor, and step 1560 of controlling the air curtain machine to generate an air flow having the calculated speed. The method 1500 can further include a step 1570 of obtaining a numeric value that is related to a property of the object that is to be prevented from hitting the sensor, e.g., as discussed with respect to FIG. 14.

Figure 16:
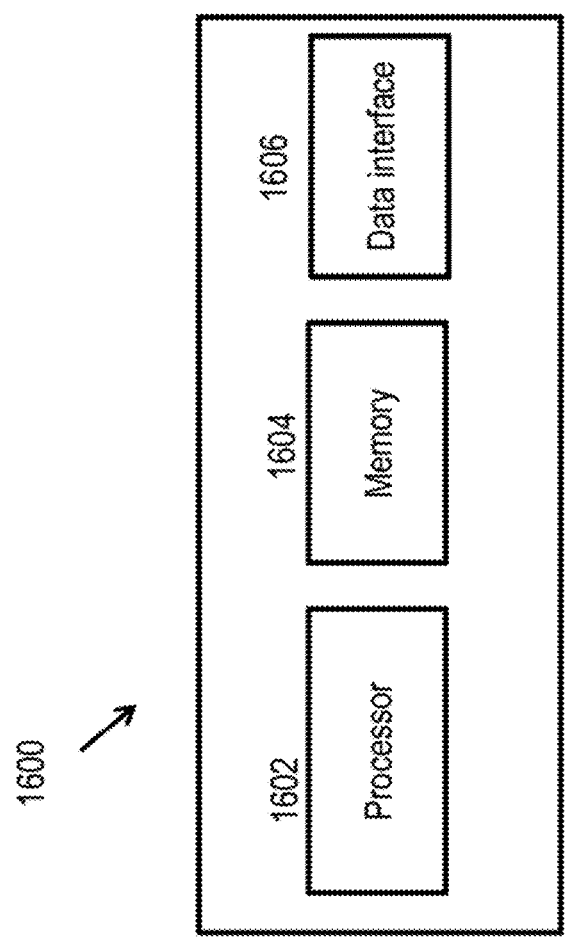
FIG. 16 illustrates a schematic diagram of an air flow controller according to an embodiment of the disclosed technology.

FIG. 16 shows a schematic diagram of a controller 1600 that can be used for the air flow control according to the method 1500 described above. The controller includes a processor 1602, a memory 1604, and a data interface 1606. The memory 1604 contains instructions that, when executed by the processor 1602, cause the processor 1602, in cooperation with the data interface 1606, to implement steps of the method 1500. The processor 1602 may perform calculations described with respect to FIG. 14. The data interface 1606 may interface with the autonomous vehicle to obtain vehicle's current speed. Not shown in FIG. 16 are other electro-mechanical functions such as a signal that increases or decreases motor torque for increasing or decreasing speed of the air flow produced by the air curtain machine.

In addition, a movable object 40 according to the technology disclosed herein is also provided, wherein the movable object 40 is equipped with the aforementioned sensor assembly 50. The movable object may be a movable object related to autonomous driving such as a vehicle (e.g., an autonomous truck, an autonomous passenger car, etc.), a robot (e.g., a warehouse logistics robot), or a drone among other movable objects that can be equipped with the sensor assembly 50 according to the technology disclosed in this patent document.

Also, a vehicle according to the technology disclosed herein is also provided, wherein the vehicle is equipped with the sensor assembly 50 according to the technology disclosed in this patent document. The vehicle may be, for example, a self-driving truck or a self-driving passenger car.

The sensor bracket, the sensor assembly comprising the sensor bracket, as well as the movable objects and vehicles equipped with the sensor assembly are provided according to the technology disclosed in this patent document. A protective air flow formed on the windward part of a sensor (e.g., a LiDAR or a camera) of the sensor assembly using the elements of the sensor bracket described in detail above, can effectively help to prevent mosquitoes and other foreign objects from impacting the sensor and sticking to it, thus affecting the sensor's perception, when moving objects such as vehicles are traveling at a high speed.

One aspect of the disclosed technology relates to a sensor bracket that includes a bracket body having a first end and a second end, wherein the first end of the bracket body is configured to connect to an automobile, the second end of the bracket body is configured to connect to a sensor; and a first air curtain machine positioned at the second end of the bracket body, the first air curtain machine having an air outlet that is positioned to cause air to flow from the first air curtain machine through the air outlet across a forward-facing direction of the sensor.

In some example embodiments of the sensor bracket, the first air curtain machine includes a motor and a fan impeller configured to cause air to flow out from the air outlet.

In some example embodiments of the sensor bracket, the sensor is a light detection and ranging (LiDAR) device, the bracket body includes a lower mounting cover, an upper mounting cover, and an upper shield, the lower mounting cover is arranged on a lower side of the LiDAR to hold the LiDAR, the upper mounting cover is arranged on a rear side of the LiDAR, the upper mounting cover is connected to the lower mounting cover, at least one of the lower mounting cover or the upper mounting cover is connected to the automobile on a side away from the LiDAR, the upper shield is connected to the upper mounting cover and is arranged on an upper side of the LiDAR, and the upper shield and the lower mounting cover cooperate to fix the LiDAR in a space between the upper shield and the lower mounting cover.

In other example embodiments of the sensor bracket, the first air curtain machine is positioned on the upper side of the LiDAR, and wherein the air outlet of the air curtain machine is facing downward in a direction along a front windward part of the LiDAR.

According to some example embodiments of the sensor bracket, the sensor bracket further includes an air curtain installation cover and an air curtain protective cover, wherein the air curtain installation cover is connected to an upper end of the upper shield, wherein the first air curtain machine is connected to an outside surface of the air curtain installation cover, wherein the air curtain protective cover cooperates with the air curtain installation cover to surround the first air curtain machine, and wherein the air curtain protective cover comprises an opening in front of the air outlet of the first air curtain machine to let the air from the air outlet of the first air curtain machine escape the air curtain protective cover.

According to other example embodiments of the sensor bracket, the first air curtain machine is positioned on the lower side of the LiDAR, and wherein the air outlet of the first air curtain machine is facing upward in a direction along a front windward part of the LiDAR.

In yet another example embodiment of the sensor bracket, the sensor bracket further includes an air curtain installation cover and an air curtain protective cover, wherein the air curtain installation cover is connected to a lower end of the lower mounting cover, wherein the first air curtain machine is connected to an outside surface of the air curtain installation cover, wherein the air curtain protective cover cooperates with the air curtain installation cover to surround the first air curtain machine, and wherein the air curtain protective cover comprises an opening in front of the air outlet of the first air curtain machine to let the air from the air outlet of the first air curtain machine escape the air curtain protective cover.

In some example embodiments of the sensor bracket, the sensor bracket further includes a second air curtain machine positioned at the second end of the bracket body, wherein the first air curtain machine is arranged on the upper side of the LiDAR, wherein the air outlet of the first air curtain faces downward in a first direction along a front windward part of the LiDAR, wherein the second air curtain machine is arranged on the lower side of the LiDAR, and wherein the air outlet of the second air curtain machine faces upward in a second direction along the front windward part of the LiDAR.

In some example embodiments of the sensor bracket, the sensor bracket further includes a first air curtain installation cover, a second air curtain installation cover, a first air curtain protective cover, and a second air curtain protective cover, wherein the first air curtain installation cover is connected to an upper end of the upper shield, wherein the first air curtain machine is connected to an outside surface of the first air curtain installation cover, wherein the first air curtain protective cover cooperates with the first air curtain installation cover to surround the first air curtain machine, and wherein the first air curtain protective cover comprises an opening in front of the air outlet of the first air curtain machine to let the air from the air outlet of the first air curtain machine escape the first air curtain protective cover, wherein the second air curtain installation cover is connected to a lower end of the lower mounting cover, wherein the second air curtain machine is connected to an outside surface of the second air curtain installation cover, wherein the second air curtain protective cover cooperates with the second air curtain installation cover to surround the second air curtain machine, and wherein the second air curtain protective cover comprises an opening in front of the air outlet of the second air curtain machine to let the air from the air outlet of the second air curtain machine escape the second air curtain protective cover.

According to an example embodiment of the sensor bracket, a plurality of vents is provided on an outer side of the air curtain protective cover.

According to some example embodiments of the sensor bracket, the plurality of vents comprises a plurality of raised structures on the outer side of the air curtain protective cover, and a lower side of each raised structure in the plurality of raised structures is provided with a through hole connecting a volume between the air curtain protective cover and the air curtain installation cover, in which the first air curtain machine is installed, to a space outside that volume.

In other example embodiments of the sensor bracket, a baffle is provided proximate to the air outlet of the first air curtain machine, wherein the baffle can be pushed open by the air discharged from the air outlet of the first air curtain machine, and can cover the air outlet when the air is not discharged from the air outlet of the first air curtain machine.

In an example embodiment of the sensor bracket, the sensor is a light detection and ranging (LiDAR) device, and wherein a width of the air outlet of the first air curtain machine is greater than or equal to a width of the LiDAR.

In another example embodiment of the sensor bracket, an air flow collector is provided at the air outlet of the first air curtain machine, and wherein the air flow collector is configured to increase a speed of air discharged from the air outlet.

Another aspect of the disclosed technology relates to a sensor assembly that includes a sensor and a sensor bracket, wherein the sensor bracket comprises a bracket body having a first end and a second end, wherein the first end of the bracket body is configured to connect to an automobile, the second end of the bracket body is configured to connect to a sensor; and a first air curtain machine positioned at the second end of the bracket body, the first air curtain machine having an air outlet that is positioned to cause air to flow from the first air curtain machine through the air outlet across a forward-facing direction of the sensor.

In an example embodiment of the sensor assembly, the sensor is a camera.

In another example embodiment of the sensor assembly, the sensor is a light detection and ranging (LiDAR) device, the bracket body includes a lower mounting cover, an upper mounting cover, and an upper shield, the lower mounting cover is arranged on a lower side of the LiDAR to hold the LiDAR, the upper mounting cover is arranged on a rear side of the LiDAR, the upper mounting cover is connected to the lower mounting cover, at least one of the lower mounting cover or the upper mounting cover is connected to the automobile on a side away from the LiDAR, the upper shield is connected to the upper mounting cover and is arranged on an upper side of the LiDAR, and the upper shield and the lower mounting cover cooperate to fix the LiDAR in a space between the upper shield and the lower mounting cover.

In yet another example embodiment of the sensor assembly, the first air curtain machine is positioned on the upper side of the LiDAR, and wherein the air outlet of the first air curtain machine is facing downward in a direction along a front windward part of the LiDAR.

According to some example embodiments of the sensor assembly, the sensor assembly further includes an air curtain installation cover and an air curtain protective cover, wherein the air curtain installation cover is connected to an upper side of the upper shield, wherein the first air curtain machine is connected to the air curtain installation cover, wherein the air curtain protective cover cooperates with the air curtain installation cover to enclose the first air curtain machine, and wherein the air curtain protective cover comprises an opening that is aligned with the air outlet of the first air curtain machine to let the air from the air outlet of the first air curtain machine pass through the opening.

Yet another aspect of the disclosed technology relates to a method of producing a sensor assembly that includes providing a sensor and providing a sensor bracket, wherein the sensor bracket comprises: a bracket body having a first end and a second end, wherein the first end of the bracket body is configured to connect to an automobile, the second end of the bracket body is configured to connect to a sensor; and a first air curtain machine positioned at the second end of the bracket body, the first air curtain machine having an air outlet that is positioned to cause air to flow from the first air curtain machine through the air outlet across a forward-facing direction of the sensor.

An aspect of the disclosed technology relates to a method of operating a vehicle, comprising: positioning a sensor bracket on the vehicle; providing a sensor; wherein the sensor bracket comprises: a bracket body having a first end and a second end, wherein the first end of the bracket body is configured to connect to an automobile, the second end of the bracket body is configured to connect to the sensor; and operating a first air curtain machine positioned at the second end of the bracket body, the first air curtain machine having an air outlet that is positioned to cause air to flow from the first air curtain machine through the air outlet across a forward-facing direction of the sensor while the vehicle is driving in the forward-facing direction.

According to some example embodiments of the method of producing a sensor assembly, the sensor bracket can include any embodiment of the sensor bracket according to the technology disclosed in this patent document.

According to some example embodiments of the method of producing a sensor assembly, the sensor can be any sensor disclosed in this patent document.

In this patent document, specific examples are used to describe the principles and example implementations of the disclosed technology. The descriptions of the above examples are only used to help understand the methods and core ideas of the disclosed technology. Those skilled in the art can change the described specific implementations while still staying within the scope of the technology disclosed in this patent document. In summary, the content of this specification should not be construed as a limitation to the disclosed technology.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A sensor bracket, comprising:
a bracket body having a first end and a second end, wherein the first end of the bracket body is configured to connect to an automobile, the second end of the bracket body is configured to connect to a sensor; and
a first air curtain machine positioned at the second end of the bracket body, the first air curtain machine having an air outlet that is positioned to cause air to flow from the first air curtain machine through the air outlet across a forward-facing direction of the sensor,
wherein the sensor is a light detection and ranging (LiDAR) device, the bracket body includes a lower mounting cover, an upper mounting cover, and an upper shield,
wherein the lower mounting cover is arranged on a lower side of the LiDAR to hold the LiDAR, the upper mounting cover is arranged on a rear side of the LiDAR, the upper mounting cover is connected to the lower mounting cover,
wherein at least one of the lower mounting cover or the upper mounting cover is configured to connect to the automobile on a side away from the LiDAR,
wherein the upper shield is connected to the upper mounting cover and is arranged on an upper side of the LiDAR, and
wherein the upper shield and the lower mounting cover cooperate to fix the LiDAR in a space between the upper shield and the lower mounting cover.

2. The sensor bracket of claim 1, wherein the first air curtain machine includes a motor and a fan impeller configured to cause air to flow out from the air outlet.

3. The sensor bracket according to claim 1, wherein the first air curtain machine is positioned on the upper side of the LiDAR, and wherein the air outlet of the first air curtain machine is facing downward in a direction along a front windward part of the LiDAR.

4. The sensor bracket according to claim 3, comprising an air curtain installation cover and an air curtain protective cover,
wherein the air curtain installation cover is connected to an upper end of the upper shield,
wherein the first air curtain machine is connected to an outside surface of the air curtain installation cover,
wherein the air curtain protective cover cooperates with the air curtain installation cover to surround the first air curtain machine, and
wherein the air curtain protective cover comprises an opening in front of the air outlet of the first air curtain machine to let the air from the air outlet of the first air curtain machine escape the air curtain protective cover.

5. The sensor bracket according to claim 1, wherein the first air curtain machine is positioned on the lower side of the LiDAR, and wherein the air outlet of the first air curtain machine is facing upward in a direction along a front windward part of the LiDAR.

6. The sensor bracket according to claim 5, comprising an air curtain installation cover and an air curtain protective cover, wherein the air curtain installation cover is connected to a lower end of the lower mounting cover, wherein the first air curtain machine is connected to an outside surface of the air curtain installation cover, wherein the air curtain protective cover cooperates with the air curtain installation cover to surround the first air curtain machine, and wherein the air curtain protective cover comprises an opening in front of the air outlet of the first air curtain machine to let the air from the air outlet of the first air curtain machine escape the air curtain protective cover.

7. The sensor bracket of claim 3, comprising
a second air curtain machine positioned at the second end of the bracket body, wherein the first air curtain machine is arranged on the upper side of the LiDAR, wherein the air outlet of the first air curtain faces downward in a first direction along the front windward part of the LiDAR, wherein the second air curtain machine is arranged on the lower side of the LiDAR, and wherein the air outlet of the second air curtain machine faces upward in a second direction along the front windward part of the LiDAR.

8. The sensor bracket according to claim 7, comprising a first air curtain installation cover, a second air curtain installation cover, a first air curtain protective cover, and a second air curtain protective cover, wherein the first air curtain installation cover is connected to an upper end of the upper shield, wherein the first air curtain machine is connected to an outside surface of the first air curtain installation cover, wherein the first air curtain protective cover cooperates with the first air curtain installation cover to surround the first air curtain machine, and wherein the first air curtain protective cover comprises an opening in front of the air outlet of the first air curtain machine to let the air from the air outlet of the first air curtain machine escape the first air curtain protective cover, wherein the second air curtain installation cover is connected to a lower end of the lower mounting cover, wherein the second air curtain machine is connected to an outside surface of the second air curtain installation cover, wherein the second air curtain protective cover cooperates with the second air curtain installation cover to surround the second air curtain machine, and wherein the second air curtain protective cover comprises an opening in front of the air outlet of the second air curtain machine to let the air from the air outlet of the second air curtain machine escape the second air curtain protective cover.

9. The sensor bracket according to claim 4, wherein a plurality of vents is provided on an outer side of the air curtain protective cover.

10. The sensor bracket according to claim 9, wherein the plurality of vents comprises a plurality of raised structures on the outer side of the air curtain protective cover, and a lower side of each raised structure in the plurality of raised structures is provided with a through hole connecting a volume between the air curtain protective cover and the air curtain installation cover, in which the first air curtain machine is installed, to a space outside that volume.

11. The sensor bracket according to claim 1, wherein a baffle is provided proximate to the air outlet of the first air curtain machine, wherein the baffle can be pushed open by the air discharged from the air outlet of the first air curtain machine, and can cover the air outlet when the air is not discharged from the air outlet of the first air curtain machine.

12. The sensor bracket of claim 1, wherein the sensor is a light detection and ranging (LiDAR) device, and wherein a width of the air outlet of the first air curtain machine is greater than or equal to a width of the LiDAR.

13. The sensor bracket according to claim 1, wherein an air flow collector is provided at the air outlet of the first air curtain machine, and wherein the air flow collector is configured to increase a speed of air discharged from the air outlet.

14. A sensor system, comprising:
a sensor; and
a sensor bracket, comprising:
a bracket body having a first end and a second end, wherein the first end of the bracket body is configured to connect to an automobile, the second end of the bracket body is configured to connect to the sensor; and
a first air curtain machine positioned at the second end of the bracket body, the first air curtain machine having an air outlet that is positioned to cause air to flow from the first air curtain machine through the air outlet across a forward-facing direction of the sensor,
wherein the sensor is a light detection and ranging (LiDAR) device, and wherein a width of the air outlet of the first air curtain machine is greater than or equal to a width of the LiDAR.

15. The sensor system according to claim 14,
wherein the sensor is a light detection and ranging (LiDAR) device, the bracket body includes a lower mounting cover, an upper mounting cover, and an upper shield,
wherein the lower mounting cover is arranged on a lower side of the LiDAR to hold the LiDAR, the upper mounting cover is arranged on a rear side of the LiDAR, the upper mounting cover is connected to the lower mounting cover,
wherein at least one of the lower mounting cover or the upper mounting cover is connected to the automobile on a side away from the LiDAR,
wherein the upper shield is connected to the upper mounting cover and is arranged on an upper side of the LiDAR, and
wherein the upper shield and the lower mounting cover cooperate to fix the LiDAR in a space between the upper shield and the lower mounting cover.

16. The sensor system of claim 15, wherein the first air curtain machine is positioned on the upper side of the LiDAR, and wherein the air outlet of the first air curtain machine is facing downward in a direction along a front windward part of the LiDAR.

17. The sensor system of claim 16, comprising
an air curtain installation cover and an air curtain protective cover,
wherein the air curtain installation cover is connected to an upper side of the upper shield,
wherein the first air curtain machine is connected to the air curtain installation cover,
wherein the air curtain protective cover cooperates with the air curtain installation cover to enclose the first air curtain machine, and
wherein the air curtain protective cover comprises an opening that is aligned with the air outlet of the first air curtain machine to let the air from the air outlet of the first air curtain machine pass through the opening.

18. A method of operating a vehicle, comprising:

positioning a sensor bracket on the vehicle;

providing a sensor;

wherein the sensor bracket comprises: a bracket body having a first end and a second end, wherein the first end of the bracket body is configured to connect to an automobile, the second end of the bracket body is configured to connect to the sensor; and operating a first air curtain machine positioned at the second end of the bracket body, the first air curtain machine having an air outlet that is positioned to cause air to flow from the first air curtain machine through the air outlet across a forward-facing direction of the sensor while the vehicle is driving in the forward-facing direction, wherein the sensor is a light detection and ranging (LiDAR) device, and wherein a width of the air outlet of the first air curtain machine is greater than or equal to a width of the LiDAR.

19. The sensor system of claim 14, further comprising:

an air curtain installation cover and an air curtain protective cover, wherein the first air curtain machine is connected to an outside surface of the air curtain installation cover, wherein the air curtain protective cover cooperates with the air curtain installation cover to surround the first air curtain machine, and wherein the air curtain protective cover comprises an opening in front of the air outlet of the first air curtain machine to let the air from the air outlet of the first air curtain machine escape the air curtain protective cover.

20. The sensor system of claim 14, further comprising:

a baffle provided proximate to the air outlet of the first air curtain machine, wherein the baffle can be pushed open by the air discharged from the air outlet of the first air curtain machine, and can cover the air outlet when the air is not discharged from the air outlet of the first air curtain machine.

\* \* \* \* \*